Aug. 22, 1939.　　　　E. C. BOOTH　　　　2,169,993
RADIATOR
Filed April 12, 1937　　　2 Sheets-Sheet 1
Fig. 1.
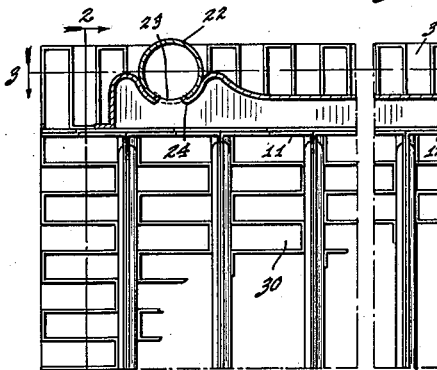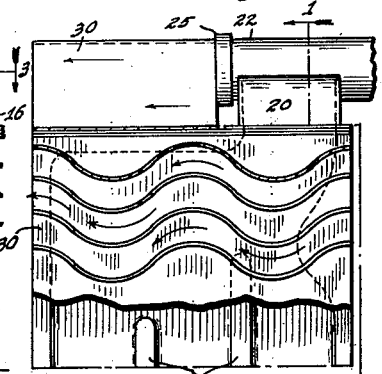
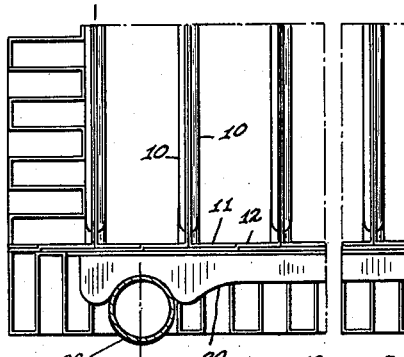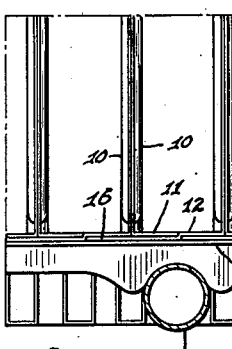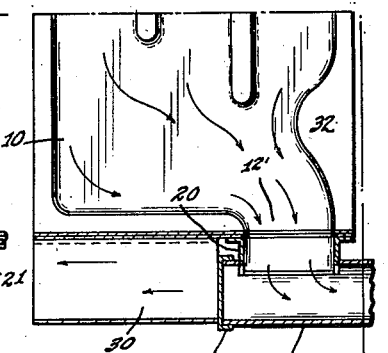
Fig. 3.
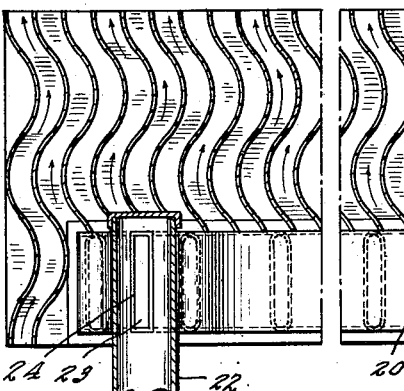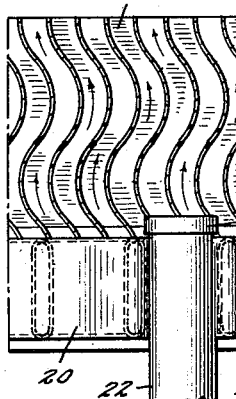
Fig. 4.
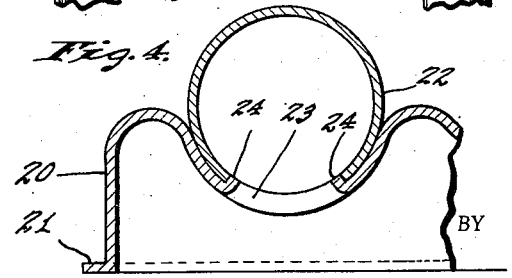
INVENTOR.
EARL C. BOOTH,
BY
ATTORNEYS.

Aug. 22, 1939.   E. C. BOOTH   2,169,993
RADIATOR
Filed April 12, 1937   2 Sheets-Sheet 2
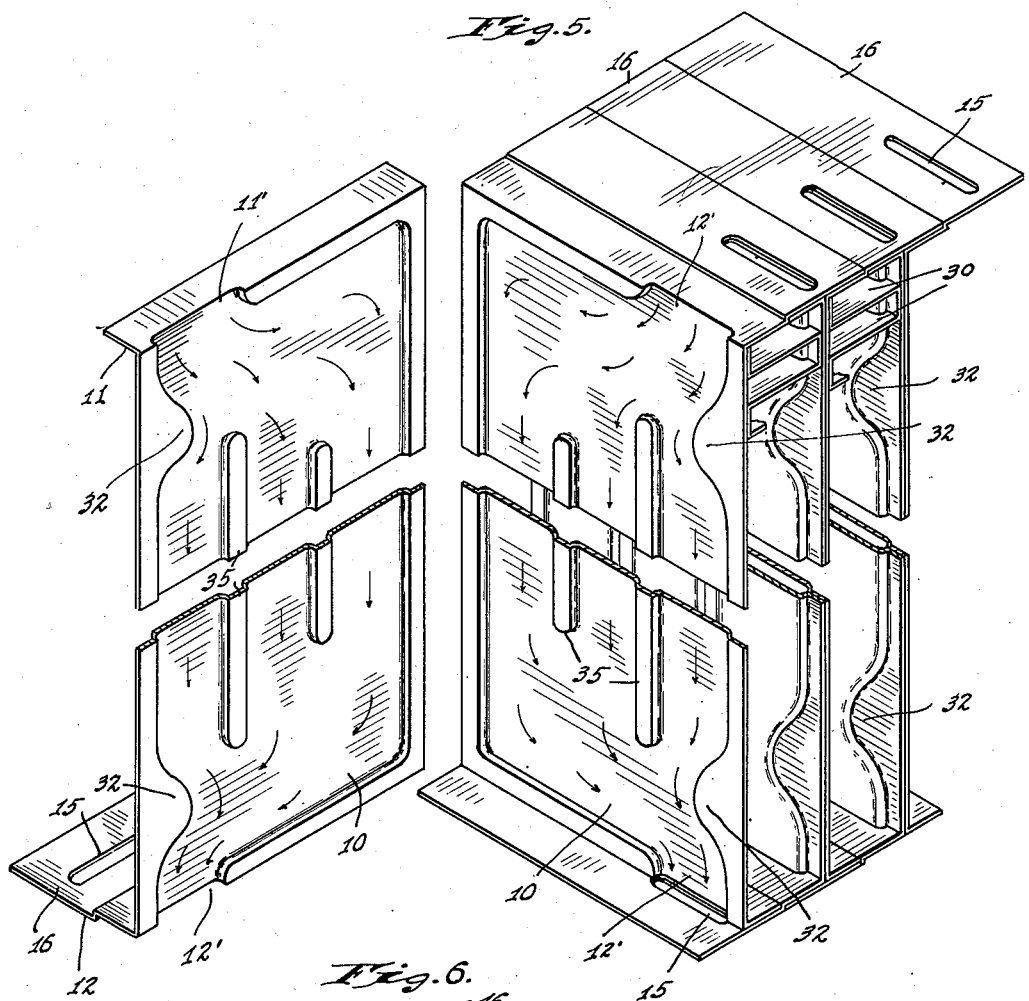
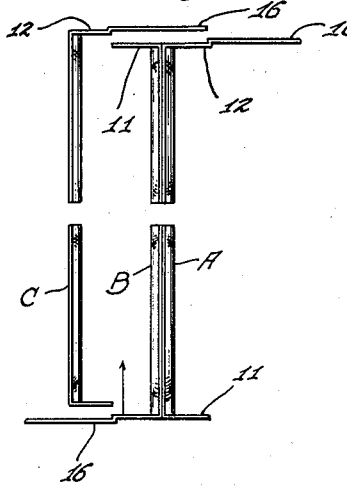
INVENTOR.
EARL C. BOOTH,
BY
ATTORNEYS.

Patented Aug. 22, 1939

2,169,993

UNITED STATES PATENT OFFICE 2,169,993

RADIATOR

Earl C. Booth, Columbus, Ind., assignor to Noblitt-Sparks Industries, Inc., Columbus, Ind., a corporation of Indiana Application April 12, 1937, Serial No. 136,265

5 Claims. (Cl. 257—139)

My invention relates to the construction of radiators and especially to the construction of radiators suitable for use in automobile-body heaters of the circulating fluid type. It is the object of my invention to produce a radiator which will be of simple construction and which can be made more economically than prior radiators of which I am aware.

In carrying out my invention, I form the core of the radiator of a plurality of identical sheet-metal stampings each of which is provided with a central depression or channel. In the finished core, these stampings are assembled in pairs with the two stampings of each pair arranged with their channels in opposed relation to form a fluid passage. Each of the stampings has at its opposite ends perpendicularly extending flanges arranged to nest with each other when the stampings are assembled in the complete core to present a substantially continuous plane surface at the two end faces of the core. Those of such flanges which overlap the fluid passages in the core are provided with openings registering with such passages; and over such openings, at each end of the core, I mount suitable headers adapted for connection respectively to fluid-supply and fluid-discharge conduits. Between adjacent pairs of stampings, and desirably also along the sides of the core, I provide heat-radiating fins which aid in transfering heat between the fluid in the passages and the air flowing through the core.

The accompanying drawings illustrate my invention: Fig. 1 is a rear elevation of a radiator core in partial section on the line 1—1 of Fig. 2; Fig. 2 is a vertical section on the line 2—2 of Fig. 1; Fig. 3 is a top plan view of the core in partial section on the line 3—3 of Fig. 1; Fig. 4 is a fragmental section similar to Fig. 1 but on an enlarged scale illustrating details of construction; Fig. 5 is an isometric view illustrating the core in process of assembly; and Fig. 6 is a fragmental front elevation also illustrating the method employed in assembling the core.

As previously indicated, the body of the core is formed of a plurality of sheet-metal stampings 10, the form of which is perhaps best evident in Fig. 5. At its ends, each of the stampings 10 is provided with flanges 11 and 12 which project laterally in the same direction from the body of the stamping, the flange 12 being considerably wider than the flange 11. The center portion of the stamping is offset out of the plane of the edges to form a depression which opens at the ends of the strip through the flanges 11 and 12, as indicated at 11' and 12'.

The openings 11' and 12' are located in the same position laterally of the stamping so that when two of the stampings are inverted relatively to each other and brought together in opposed relation the opening 11' of each will register with the opening 12' of the other. With the two stampings in this position, the central depressions form continuous fluid-passages extending for the full length of the stampings and opening at each end through the flanges 11 and 12. In Fig. 6 two stampings A and B are shown in assembled relation while a third stamping C is being moved into association with them. When the stamping C is in position, a fourth stamping, arranged in the same manner as the stamping B, will be brought into association with the stamping C, and the process is continued until a core of the desired width is assembled.

The flange 12 of each stamping is made of a width great enough to overlap the fluid-passage formed by the adjacent pair of stampings, and is therefore provided with an opening 15 positioned to register with the opening 11'—12' of such adjacent pair of stampings. At an intermediate point in its width each flange 12 is offset outwardly along a line parallel to the body of the stamping to provide an offset flange-portion 16 the amount of the offsetting being equal to the thickness of the metal from which the stampings are formed. This permits the various flanges to nest with each other and the offset flange-portions 16 to present a substantially continuous plane surface at the ends of the core, as is clearly evident from Fig. 5. After the core has been assembled it is sealed, desirably by dipping its front, back, and end faces in solder.

To complete the radiator, headers are applied at each end thereof over the row of openings 15. Each of such headers is desirably formed of a cup-like sheet-metal stamping 20 having around its open face a peripheral flange 21 adapted to rest on and be soldered to the surface presented by the offset flange portions 16. Each of these headers is arranged for connection to one or more fluid-conduits, two of such conduits being shown in the drawings. The stamping 20 is formed with a transverse depression of arcuate cross-section adapted to receive the associated conduit 22 as is clear from Fig. 4, and in the bottom of this depression there is provided an opening 23 the edges of which are turned outwardly to form a flange 24 adapted to be received in a slot in the wall of the associated conduit 22. After each conduit is put in place in the position indicated in Fig. 4, it is soldered to the header 20, the flange 24 serving to prevent the solder from running into the interior of the core. The ends of the conduits 22 may be closed by caps 25, desirably held in place by soldering.

To aid in the transfer of heat between fluid in the core passages and air passing through the core heat-radiating fins are provided. These fins are desirably formed by a strip of sheet-metal bent into a zig-zag form along undulatory lines to provide a plurality of sinuous air passages 30. One set of fins thus made may be disposed between adjacent pairs of fluid passages of the core, along the sides of the core, and across the top and bottom of the core, as is clear from Figs. 1, 2, and 3.

As brought out in my co-pending application Serial No. 134,267, filed April 1, 1937, it is preferably desirable to locate the headers 20 nearer one face of the core than the other, and the headers are shown so located in the drawings. With the headers located near one face of the core, the openings 11'—12' will be disposed near one side of the fluid-passages with which they communicate; and, as the openings at opposite ends of the core are in alignment with each other, there would be a tendency for the fluid at the remote side of each passage to remain stagnant. To counteract any such tendency, I form each stamping with a deflector 32 in the form of a curved projection which extends inwardly of the stamping into the central depression adjacent each of the openings 11' and 12'. Some of the fluid entering the openings 11' and 12' impinges upon the deflector 32 and is deflected laterally toward the remote side of the fluid passage to prevent any tendency toward stagnation.

In practice, the stampings of which the core is formed will be made of relatively thin sheet-metal, preferably sheet-metal of about 0.005 inch in thickness. To reinforce the stamping and thereby to prevent collapse of the walls of the fluid-passages, I may form each stamping, within its central depression, with one or more longitudinally extending reinforcing ribs 35. These ribs are formed by offsetting the material of the stamping into the plane of the edges of the stamping, so that when a pair of stampings is assembled the ribs 35 will abut against each other to prevent the passage-walls from collapsing. If more than one reinforcing rib 35 is employed in each stamping, they are desirably made of graduated lengths with the longer ribs located nearer the openings 11'—12' to avoid interference with the transverse flow of fluid created by the deflectors 42.

I claim as my invention:

1. In a radiator core, a plurality of similar sheet-metal stampings each extending longitudinally of the core and provided at its ends with parallel flanges extending laterally in the same direction from the body of the stamping, one of said flanges being wider than the other, each of said stampings being provided in the face opposite said flanges with a longitudinally extending channel opening at its ends through said flanges, said stampings being arranged in pairs with the two stampings of each pair having their channels in opposed relation to define a fluid passage and with the broader flange of each stamping overlapping one end of the fluid passage between an adjacent pair of stampings, said broader flanges having holes alined with the fluid passages which they respectively overlap, and headers secured to the core-body at opposite ends thereof and overlapping said flange-openings.

2. The invention set forth in claim 1 with the addition that the two stampings of each pair are arranged with their respective broad flanges at opposite ends of the passage between them, each of said broad flanges being offset outwardly where it overlaps the flanges of the stampings forming the adjacent passage and extending to the corresponding offset in the broad flange which it overlaps whereby the offset portions of the broad flanges form a substantially continuous plane surface at each end of the core.

3. The invention set forth in claim 1 with the addition that the two stampings of each pair are arranged with their respective broad flanges at opposite ends of the passage between them, each of said broad flanges being offset outwardly where it overlaps the flanges of the stampings forming the adjacent passage.

4. In a radiator core, a plurality of sheet-metal stampings extending longitudinally of the core, each of said stampings being formed with a longitudinally extending channel in one face, said stampings being arranged in pairs with the two stampings of each pair having their channels in opposed relation to form a fluid-passage, each pair of said stampings being provided at their ends with outwardly extending lateral flanges which overlap and are secured to the flanges of an adjacent pair of stampings.

5. The invention set forth in claim 4 with the addition that one of each two overlapping flanges has its overlapping portions offset.

EARL C. BOOTH.